C. W. LANE.
ARTIFICIAL FISH BAIT.
APPLICATION FILED MAY 27, 1919.
1,334,249.
Patented Mar. 16, 1920.
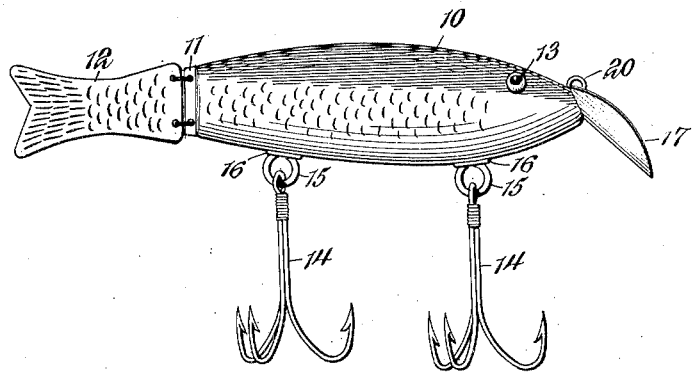
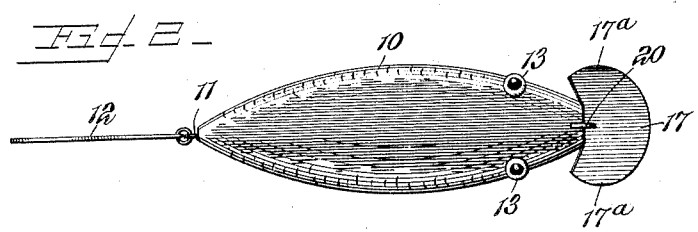
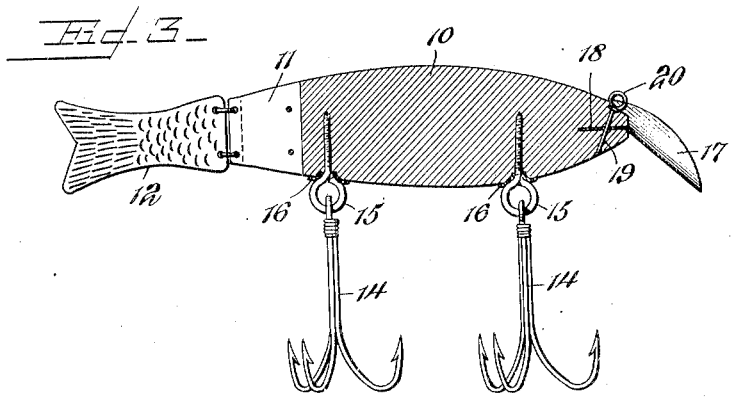
Charles W. Lane
INVENTOR

UNITED STATES PATENT OFFICE.

CHARLES W. LANE, OF MADRID, NEW YORK, ASSIGNOR OF ONE-HALF TO WEBSTER E. GRIFFITH, OF MADRID, NEW YORK.

ARTIFICIAL FISH-BAIT.

1,334,249.   Specification of Letters Patent.   Patented Mar. 16, 1920.

Application filed May 27, 1919. Serial No. 300,117.

*To all whom it may concern:*

Be it known that I, CHARLES W. LANE, a citizen of the United States, residing at Madrid, in the county of St. Lawrence and State of New York, have invented a new and useful Artificial Fish-Bait, of which the following is a specification.

This invention relates to artificial fish bait, and particularly to artificial minnows.

The primary object of the invention is to provide an artificial bait which will simulate the movements of a live minnow when drawn through the water.

A further object is to furnish an artificial bait which will appear very life-like, regardless of the speed or depth at which it is trolled, and which may be easily carried by the sportsman.

In order to fully understand this invention, reference should be made to the drawing which accompanies and forms a part of this specification, and in which the preferred embodiment of the invention is shown. In said drawing—

Figure 1 is a side elevation of a preferred form of the invention;

Fig. 2 is a top plan view of the same; and

Fig. 3 is a central vertical longitudinal section of the same.

The numeral 10 designates the main body of the bait, formed like a minnow from light wood or other buoyant material. This body is preferably given several coats of paint or enamel, so that the finished body appears to have the dark back, the pale belly, and the scales of a minnow. Eyes 13, preferably of glass or the like are fastened in the forward part of the body. A plate 11 is secured in a vertical kerf cut in the rear end of body 10, and holds a hingedly mounted flat tail 12 in place. The tail is preferably of some brightly polished light metal. The hinge connection between the plate 11 and the tail may be of any character, so long as it permits the tail to swing freely from one side of the body to the other.

A plurality of hooks 14 are detachably secured by screw eye 15 to the body, preferably to the under part thereof. To protect the wood of the body, metal caps or washers 16 are provided.

At the forward end of the bait body a curved plate 17 is attached at an angle to the body, preferably by means of a horizontal centrally - disposed extension 18 fitted into a kerf cut where the minnow's mouth would be. The plate extends outwardly and downwardly from the body at an angle, and is of greater width than the forward end of the body. An eye bolt 19 with an eye 20 is run through the forward end of the body and through the extension 18. The eye 20 of this bolt serves also as an attaching means for the fish line. A screw could, however, be substituted for the same. The plate 17 is dished as the drawing clearly shows so as to present a concave surface to the water rushing past the minnow as it is trolled. The convex inner surface is preferably painted a bright color, as red, while the concave outer surface should be colored in a manner similar to the back of the bait so as to make the plate inconspicuous from the forward end. The colors are, however, not essential. The plate 17 being secured at the center of its inner edge to the body may be given greater or less dish or concavity by bending, either upwardly or downwardly the side wings 17ª thereof, on each side of the point of attachment to the body thereby modifying the action of the artificial bait at will. The inner edges of the wings are spaced from the body as shown in Fig. 2, which provides for the escape of the water as it passes up the plate, on each side of the body.

The buoyancy of the main body is sufficient to maintain the bait normally on the surface of the water. When the bait is being trolled slowly, the inclination of the plate will force the head of the bait slightly under the water, the plate imparting an erratic movement to the bait. The tail being freely swingable, adds to the life-like appearance of the bait. As the trolling speed is increased, the bait is forced farther under water, and the wobbly, uncertain movements increase, the tail moving at the same time. It is the combination of the freely swinging tail and the peculiar form and setting of the plate which makes the invention a "killing" bait for many varieties of game fish. The coloring of the plate and tail also adds to the attractiveness of the bait. The fact that the tail swings freely allows it to be folded against the body, and thus permits a sportsman to carry the bait more easily.

Having described the invention, what is claimed is:—

1. In an artificial bait, a floatable body, a freely swinging tail attached to the rear end of the body, and a concaved plate rigidly secured to the forward end thereof at substantially the central portion of its inner edge, said plate being of greater width than the forward end of the body and extending downwardly and outwardly away from the body at an angle thereto.

2. In an artificial bait, a floatable body, a freely swinging tail attached to the rear end of the body, and a concaved plate rigidly secured to the forward end thereof at substantially its central portion, and being of greater width than the forward end of said body so as to provide bendable side wings by the bending of which the concavity of the plate may be changed at will.

3. In an artificial bait, a floatable body, a swingable tail attached to the rear end of the body, and a dished plate secured to the forward end thereof and depending at an angle to the body, said plate having an extension at its inner edge fitted into said body.

4. In an artificial bait, a floatable body, a swingable tail attached to the rear end of the body, a dished plate secured to the forward end thereof and depending at an angle to the body, said plate having an extension fitted into the body, and means passing through the body and through the extension for securing the plate thereto, said means providing an attaching means for the line.

In testimony that I claim the foregoing as my own, I have hereto affixed my signature in the presence of two witnesses.

CHARLES W. LANE.

Witnesses:
EDWARD P. MARTIN,
H. F. BULLARD.